(12) United States Patent
Steinert et al.

(10) Patent No.: US 7,344,588 B2
(45) Date of Patent: Mar. 18, 2008

(54) ANTI-SKINNING AGENTS HAVING A MIXTURE OF ORGANIC COMPOUNDS AND COATING COMPOSITIONS CONTAINING THEM

(75) Inventors: Andreas Steinert, Langenfeld (DE); Peter Manshausen, Köln (DE)

(73) Assignee: Borchers GmbH, Monhein (DE)

( * ) Notice: Subject to any disclaimer, the term of this patent is extended or adjusted under 35 U.S.C. 154(b) by 0 days.

(21) Appl. No.: 11/546,607

(22) Filed: Oct. 12, 2006

(65) Prior Publication Data

US 2007/0022906 A1 Feb. 1, 2007

Related U.S. Application Data

(62) Division of application No. 10/811,349, filed on Mar. 26, 2004, now abandoned.

(30) Foreign Application Priority Data

Jul. 11, 2001 (DE) ................................. 101 33 727

(51) Int. Cl.
C09D 5/00 (2006.01)
C09D 5/02 (2006.01)
C09D 11/02 (2006.01)
C09K 15/20 (2006.01)
C09K 15/22 (2006.01)

(52) U.S. Cl. ...................... 106/263; 106/264; 106/265; 106/252; 252/401; 252/403; 252/405; 252/407

(58) Field of Classification Search ................ 106/263
See application file for complete search history.

(56) References Cited

U.S. PATENT DOCUMENTS

| | | | | |
|---|---|---|---|---|
| 4,009,175 A | * | 2/1977 | Hester, Jr. .................... | 540/565 |
| 4,333,865 A | * | 6/1982 | Zuckert ....................... | 523/410 |
| 4,618,371 A | | 10/1986 | Weiss et al. ................. | 106/263 |
| 4,720,566 A | * | 1/1988 | Martin ........................ | 558/306 |
| 4,859,746 A | * | 8/1989 | Fischer et al. ............... | 525/293 |
| 5,981,454 A | * | 11/1999 | Small .......................... | 510/175 |
| 5,985,018 A | | 11/1999 | Link et al. ............. | 106/287.25 |
| 6,103,788 A | * | 8/2000 | Harui et al. ................. | 523/403 |
| 6,156,661 A | | 12/2000 | Small .......................... | 438/692 |
| 6,262,169 B1 | * | 7/2001 | Helmer et al. ................ | 524/55 |
| 6,479,608 B1 | * | 11/2002 | Nesvadba et al. ........ | 526/328.5 |
| 6,489,398 B1 | * | 12/2002 | Zuckert et al. ........... | 525/167.5 |

FOREIGN PATENT DOCUMENTS

| | | |
|---|---|---|
| DE | 1 519 103 | 12/1969 |
| JP | 58-015553 A | 1/1983 |
| JP | 62-4478 A | 1/1987 |
| JP | 10-7935 A | 1/1998 |
| JP | 10-17629 A | 1/1998 |
| JP | 11-246797 A | 9/1999 |
| WO | WO 00/11090 | 3/2000 |

\* cited by examiner

*Primary Examiner*—Joseph D. Anthony
(74) *Attorney, Agent, or Firm*—Hahn Loeser & Parks; Keith J. Marcinowski

(57) ABSTRACT

The invention relates to a process for preventing skinning of a coating composition comprising adding an anti-skinning agents containing mixtures of organic compounds (combinations of additives), whereby the organic compounds are selected from the groups of organic hydroxylamines, and β-dicarbonyl compounds and/or selected derivatives of formic acid to the coating composition.

7 Claims, No Drawings

ANTI-SKINNING AGENTS HAVING A MIXTURE OF ORGANIC COMPOUNDS AND COATING COMPOSITIONS CONTAINING THEM

This application is a divisional of Ser. No. 10/811,349 filed Mar. 26, 2004 now abandoned.

FIELD OF THE INVENTION

The invention relates to a process for preventing skinning of a coating composition comprising adding anti-skinning agents containing mixtures of organic compounds (combinations of additives), whereby the organic compounds are selected from the groups of organic hydroxylamines, and β-dicarbonyl compounds and/or selected derivatives of formic acid to the coating composition.

BACKGROUND OF THE INVENTION

Colorless and pigmented oxidatively drying paints and coatings based on oxidatively drying oils, alkyd resins, epoxy esters and other oxidatively drying refined oils are known. These oils and binders crosslink oxidatively under the influence of oxygen (preferably atmospheric oxygen) by means of the addition of driers, such as metal carboxylates of transition metals. If this crosslinking takes place before the product is actually used, they can form a solid binder film, a skin, on the surface when stored in open or closed containers. This is highly undesirable and should therefore be avoided since it makes the paint more difficult to work with, and commonly interferes with the uniform distribution of the driers. The accumulation of the driers in the paint skin that forms can lead to considerable delays in the drying of the paint when it is applied.

Skinning in the paint film after application is also disadvantageous. Excessively rapid drying of the surface of the paint prevents the lower film layers from drying evenly because they are shielded from oxygen, which is prevented from sufficiently penetrating into and dispersing within the paint film. This can lead among other things to flow problems in the paint film, adhesion problems, or insufficiently hard films.

It is known to add organic substances to the paint that inhibit the reaction of the drier metal with (atmospheric) oxygen by binding the oxygen or by complexing of the drier metal. Formulations of known compounds that are suitable for this purpose can be found e.g. in H. Kittel "Lehrbuch der Lacke und Beschichtungen", Colomb Verlag 1976; J. Bieleman "Lackadditive" Wiley VCH 1998 or Römpp Lexikon "Lacke und Druckfarben", Thieme Verlag 1998.

Furthermore, DE-A 3 418 988 describes the use of aliphatic α-hydroxy ketones as anti-skinning agents, and DE-A 1 519 103 discloses N,N-dialkylated hydroxylamines for this purpose. Because of their low volatility, however, these agents can lead to severe delays in drying and often also to reduced film hardness values, so that their possible applications are limited. They have not been able to gain acceptance as anti-skinning agents.

EP-A 0 903 380 describes the use of α-keto-functionalised carboxylic acids and dicarboxylic acids and of derivatives thereof, optionally in combination with diketo compounds, as anti-skinning agents. A disadvantageous property of such products lies in their limited stability and hence restricted storage life.

Finally, pyrazole or imidazole derivatives, optionally in combination with aliphatic diketones, in particular acetylacetone, are recommended for this purpose in WO 00/11090. However, the cited aromatic amines can cause severe discoloration in the coating composition and also in the applied paint film and likewise give rise to severe delays in drying.

Oximes (in particular butanone oxime) or suitable phenolic compounds are mostly used today as anti-skinning agents in industry. The phenolic anti-skinning agents display a significant delay in surface drying, however, such that alone they are only suitable for certain coating compositions. Oximes such as e.g. methyl ethyl ketoxime or butyraldoxime, on the other hand, display only slight delays in surface drying due to their volatility. The most significant disadvantage of the oximes, which are widely used today, lies in their toxicity. In long-term inhalation studies on rats and mice, for example, an increased occurrence of liver tumors was observed after exposure to butanone oxime, as a result of which the German MAK committee has classified the substance as a category III A 2 carcinogen (MAK list 1997) [MAK=maximum allowable concentration in the workplace]. As a consequence of this, users have to observe elaborate personal protection precautions when working with paints containing oximes as anti-skinning agents.

It is an object of the present invention to develop organic compounds which prevent skinning in paints and coating compositions over an extended period and display only a slight delay in surface drying. Furthermore, the film hardness values obtained in the resulting films or coatings should not be negatively influenced and no discoloration should be caused. The products should display no disadvantageous toxicological properties.

It is another object of the invention that the organic compounds can be incorporated into many different oxidatively drying paints and coatings and by virtue of their physical properties can be used straight-forwardly and for many purposes in corresponding coating compositions.

Surprisingly it was found that these requirements could be achieved by the use of mixtures containing the organic compounds described below. In particular, the above-mentioned disadvantages of the specified hydroxylamines as anti-skinning agents could also be avoided by combining such substances with the additional compounds described below, and hence products that better satisfy requirements as anti-skinning agents are obtained.

In air-drying paints the mixtures according to the invention are suitable for preventing undesirable skinning, for improving the complete drying of paint films after application and for reducing the tendency of the applied paint film to discolor.

SUMMARY OF THE INVENTION

The invention relates to an anti-skinning agent containing
a) an organic compound of formula (I)

where
R$^1$ and R$^2$ mutually independently represent hydrogen, a linear or branched, saturated or unsaturated C$_1$-C$_{20}$ aliphatic radical, which can optionally be mono- or polysubstituted, or a C$_6$-C$_{12}$ aryl radical, a C$_7$-C$_{14}$ araliphatic radical or a C$_5$-C$_7$ cycloaliphatic radical,
and either or both of b) an organic compound of formula (II)

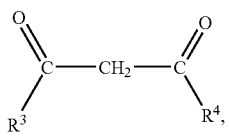

where
$R^3$ represents hydrogen, a hydroxyl radical, a substituted or unsubstituted, saturated or unsaturated $C_1$-$C_{19}$ aliphatic radical, a $C_1$-$C_7$ alkoxy radical, or an amine radical —$NR^7R^8$,
$R^4$ represents hydrogen, hydroxyl radical, a substituted or unsubstituted, saturated or unsaturated $C_1$-$C_{19}$ aliphatic radical, a $C_1$-$C_7$ alkoxy radical, or an amine radical —$NR^9R^{10}$,
$R^7$ and $R^8$ mutually independently represent hydrogen or a $C_1$-$C_6$ aliphatic radical,
$R^9$ and $R^{10}$ mutually independently hydrogen or a $C_1$-$C_6$ aliphatic radical, and
c) an organic compound of formula (III)

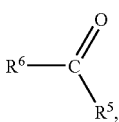

where
$R^5$ represents hydrogen, a hydroxyl radical or a $C_1$-$C_7$ alkoxy radical and
$R^6$ represents hydrogen or an amine radical —$NR^{11}R^{12}$,
$R^{11}$ and $R^{12}$ mutually independently represent hydrogen, substituted or unsubstituted $C_1$-$C_6$ aliphatic radical, or substituted or unsubstituted $C_5$-$C_7$ cycloaliphatic radical, or amine radical —$NR^1$, $R^2$ with the proviso that $R^5$ and $R^6$ are not simultaneously hydrogen.

The invention also relates to compositions of matter containing these anti-skinning agents.

DETAILED DESCRIPTION OF THE INVENTION

For the purposes of the invention mixtures of organic compounds of formulae (I) to (III) are used alone or as solutions or dispersions or emulsions in water and/or organic solvents. Suitable organic solvents include all conventional solvents, such as aromatics, white spirits, ketones, alcohols, ethers and fatty acid esters.

For the use according to the invention the organic compounds of formulae (I) to (III) can be used in a broad range of mixtures with one another. They are preferably used in the ratio (I):(II) or (III)=0.1:10 to 10:0.1 parts. In a mixture consisting of all three components, each of the components can mutually independently preferably be used in the ratio 0.1 to 10 to each of the other components used. They can be used in pure form or in aqueous solution or aqueous dispersion or emulsion or in the form of solutions in organic solvents, whereby aqueous in this context is intended to mean that water is either the sole solvent or is added in a quantity of over 50 wt. % relative to the solvent blend together with conventional organic solvents (e.g. alcohols).

The amount of anti-skinning agents primarily depends on the content of binder and drier used in the particular coating composition. As a general rule between 0.001 and 2.0 wt. % of mixtures of compounds according to formulae (I) to (III) should be added. Preferred amounts to be used are 0.01 to 0.5 wt. %, relative in each case to the overall recipe of the coating composition. The amounts can also depend on the type of binder and the pigments used. Thus in special systems the relative amount of additive to be used can also be greater than 2.0 wt. % (relative to the overall recipe).

It is an advantage of the anti-skinning agent of the present invention that it reliably prevent skinning in a wide range of binders and when used with various driers but does not unfavorably influence other drying properties of the paint.

The invention is further illustrated but is not intended to be limited by the following examples in which all parts and percentages are by weight unless otherwise specified.

EXAMPLES

The following embodiments of the mixtures of organic compounds of formulae (I) to (III) that are suitable for use according to the invention as anti-skinning agents are cited by way of example:
a) 19% diethyl hydroxylamine, 22% diethyl formamide, 59% water;
b) 19% diethyl hydroxylamine, 22% diethyl formamide, 59% ethanol;
c) 15% diethyl hydroxylamine, 9% 2,4-pentane dione, 60% ethanol, 16% water;
d) 19% diethyl hydroxylamine, 17.5% N-methyl acetoacetamide, 63.5% ethanol;
e) 10% diethyl hydroxylamine, 9% hydrazine ethyl carboxylate, 79.5% ethanol, 1.5% water;
f) 25% dibenzyl hydroxylamine, 15% N-methyl acetoacetamide, 10% ethanol, 50% acetone;
g) 23% dibenzyl hydroxylamine, 10% diethyl formamide, 10% ethanol, 57% acetone;
h) 10% diethyl hydroxylamine, 9% malonic acid, 10% diethyl formamide, 60% ethanol, 11% water;
i) 10% diethyl hydroxylamine, 9% ethyl formiate, 50% ethanol, 31% water;
j) 10% diethyl hydroxylamine, 10% ethyl acetoacetate, 78% water;
k) 10% diethyl hydroxylamine, 9% dimethyl malonate, 60% ethanol, 21% water;
l) 10% diethyl hydroxylamine, 9% malonic acid, 50% ethanol, 31% water;
m) 20% hydroxylamine, 15% N-methyl acetoacetamide, 30% ethanol, 35% water;
n) 24% hydroxylamine, 11% hydrazine ethyl carboxylate, 25% ethanol, 40% water.

Examples of the Use of Anti-Skinning Agents According to the Invention 1. 0.15 g of a cobalt-containing drier (trade name Octa-Soligen Cobalt 6 from Borchers GmbH, contains 6 wt. % Co), 0.33 g of a zirconium-containing drier (trade name Octa-Soligen Zirkon 18 from Borchers GmbH, contains 18 wt. % Zr) and 0.18 g of a calcium-containing drier (trade name Octa-Soligen Calcium 4 from Borchers GmbH, contains 4 wt. % calcium) were added to a coating composition consisting of 25.0 g of a long-oil, high-gloss white alkyd resin topcoat (binder solids content 68 wt. %).

0.018 g of the mixture listed under a) was added to the formulation and the time taken for a skin to form on the surface of a closed 125 ml PE beaker filled to approx. ¼ was established. Skinning was prevented for 33 days in this case. By way of comparison, the skinning time for a sample without anti-skinning additive determined under identical conditions was 5 days, that for a sample containing a conventional, suitable amount of butanone oxime (0.12 g) was 18 days. The color co-ordinate b* of a corresponding paint film with a 100 μm wet film thickness (according to CIELAB, corresponding to DIN 6174) determined after a storage period of 1 week resulted in a value when the mixture according to the invention was used that was 0.7463 points lower than the tristimulus value of the sample containing butanone oxime, determined under identical conditions, as a result of which a reduced yellowing of the film was indicated.

2. 0.38 g of a cobalt-containing mixed drier (trade name Octa-Soligen Trockner 203 from Borchers GmbH, contains 1.2 wt. % Co, 3.2 wt. % zinc and 7.2 wt. % barium) was added to a coating composition consisting of 25.0 g of a high-gloss white alkyd resin topcoat (binder solids content 36.9 wt. %). 0.046 g of the mixture listed under c) was added to the formulation and the time taken for a skin to form on the surface of a closed 125 ml PE beaker filled to approx. ¼ was established. Skinning was prevented for more than 27 days in this case. By way of comparison, the skinning time for a sample without anti-skinning additive determined under identical conditions was 2 days and that for a sample containing a conventional, suitable amount of butanone oxime (0.041 g) was 10 days. The gloss of the paint film (according to DIN 67530) determined after a storage period of 1 week was determined as 85.9 points (measured at 20°) and 92.8 points (measured at 60°) when the mixture according to the invention was used. By way of comparison, the gloss of the paint film from the sample without anti-skinning additive determined under identical conditions was 81.6 points (measured at 20°) and 88.5 points (measured at 60°), that of the film from the sample containing butanone oxime was 82.1 and 89.9 points (at 20° and 60° respectively). The color co-ordinate b* of a corresponding paint film with a 100 μm wet film thickness (according to CIELAB, corresponding to DIN 6174) determined after a storage period of 1 week resulted in a value when the mixture according to the invention was used that was 0.300 points lower than the tristimulus value of the sample containing butanone oxime, determined under identical conditions, as a result of which a reduced yellowing of the film was indicated.

3. 0.10 g of a cobalt-containing drier (trade name Octa-Soligen Cobalt 6 from Borchers GmbH, contains 6 wt. % Co) and 0.4 g of a calcium-containing drier (trade name Octa-Soligen Calcium 4 from Borchers GmbH, contains 4 wt. % calcium) were added to a coating composition consisting of 30.0 g of a long-oil alkyd resin (trade name Alkydal U 601 from Bayer AG) and 2.2 g white spirit D 60. 0.005 g of the mixture listed under d) was added to the formulation and the time taken for a skin to form on the surface of a closed 125 ml PE beaker filled to approx. ¼ was established. Skinning was prevented for more than 50 days in this case. By way of comparison, the skinning time for a sample without anti-skinning additive determined under identical conditions was 6 days, the skinning time for a sample containing a conventional, suitable amount (0.05 g) of butanone oxime was 16 days and that for a sample containing an identical amount (0.001 g) of diethyl hydroxylamine in the same solvent was 7 days. The König pendulum hardness (determined according to DIN 53 157, 100 μm wet film thickness) of a paint film to which the mixture according to the invention had been added was 97 seconds after a storage period of 1 week. By way of comparison, the pendulum hardness of the paint film from the sample without anti-skinning additive determined under identical conditions was 96 seconds, that of the film from the sample containing butanone oxime was likewise 97 seconds and that of the film from the sample containing diethyl hydroxylamine was 93 seconds, in each case after a storage period of 1 week.

4. 0.40 g of a cobalt-containing mixed drier (trade name Octa-Soligen Trockner 203 from Borchers GmbH, contains 1.2 wt. % Co, 3.2 wt. % zinc and 7.2 wt. % barium) was added to a coating composition consisting of 30.0 g of a high-gloss white alkyd resin topcoat (binder solids content 36.9 wt. %). 0.005 g of the mixture listed under b) was added to the formulation and the time taken for a skin to form on the surface of a closed 125 ml PE beaker filled to approx. ¼ was established. Skinning was prevented for 42 days in this case. By way of comparison, the skinning time for a sample without anti-skinning agent determined under identical conditions was 8 days, the skinning time for a sample containing a conventional, suitable amount (0.05 g) of butanone oxime was 21 days and that for a sample containing an identical amount (0.001 g) of diethyl hydroxylamine in the same solvent was likewise 21 days. The drying time of a corresponding paint film (100 μm wet film thickness) from the mixture according to the invention was 12 h (scratch drying according to test specification 100-94 from Borchers GmbH). The drying time of a sample without anti-skinning additive determined under identical conditions was 10 h 30 min., that of the sample containing butanone oxime was determined as 10 h. The drying time of the paint film from the sample containing diethyl hydroxylamine was 14 h. The color co-ordinate b* of a corresponding paint film with a 100 μm wet film thickness (according to CIELAB, corresponding to DIN 6174) determined after a storage period of 1 week was 2.2754 when the mixture according to the invention was used. The tristimulus values for the samples without anti-skinning agent and with an identical amount (0.001 g) of diethyl hydroxylamine in the same solvent determined under identical conditions were 2.4214 and 2.4434 units respectively, as a result of which a reduced yellowing of the coating composition containing the mixture according to the invention was indicated.

5. 0.10 g of a cobalt-containing drier (trade name Octa-Soligen Cobalt 6 from Borchers GmbH, contains 6 wt. % Co) and 0.4 g of a calcium-containing drier (trade name Octa-Soligen Calcium 4 from Borchers GmbH, contains 4 wt. % calcium) were added to a coating composition consisting of 30.0 g of a long-oil alkyd resin (trade name Alkydal U 601 from Bayer AG) and 2.2 g white spirit D 60. 0.023 g of the mixture listed under h) was added to the formulation and the time taken for a skin to form on the surface of a closed 125 ml PE beaker filled to approx. ¼ was established. Skinning was prevented for 22 days in this case. By way of comparison, the skinning time for a sample without anti-skinning additive determined under identical conditions was 3 days and that for a sample containing a conventional, suitable amount of butanone oxime (0.05 g) was 10 days. The König pendulum hardness (determined according to DIN 53 157, 100 μm wet film thickness) of a paint film to which the mixture according to the invention had been added was 75 seconds after a storage period of 1 week. By way of comparison, the pendulum hardness of the paint film from the sample without anti-skinning additive determined under identical conditions was 73 seconds, that of the film from the sample containing butanone oxime was 76 seconds.

6. 0.18 g of a cobalt-containing drier (trade name Trockner 69 from Borchers GmbH, contains 6 wt. % Co and 9 wt. % zirconium) and 0.4 g of a calcium-containing drier (trade name Octa-Soligen Calcium 10 from Borchers GmbH, contains 10 wt. % calcium) were added to a coating composition consisting of 40.0 g of a long-oil alkyd resin (trade name Alkydal F 681 from Bayer AG), 4.0 g white spirit D 60, 4.0 g xylene, 1.0 g n-butanol. 0.04 g of the mixture listed under e) was added to the formulation and the time taken for a skin to form on the surface of a closed 125 ml PE beaker filled to approx. ¼ was established. Skinning was prevented for 102 days in this case. By way of comparison, the skinning time for a sample without anti-skinning additive determined under identical conditions was 11 days, the skinning time for a sample containing a conventional, suitable amount (0.10 g) of butanone oxime was 26 days and that for a sample containing an identical amount (0.004 g) of diethyl hydroxylamine in the same solvent blend was likewise 26 days. The König pendulum hardness (determined according to DIN 53157, 100 µm wet film thickness) of a paint film to which the mixture according to the invention had been added was 41 seconds after a storage period of 1 week. By way of comparison, the pendulum hardness of the paint film from the sample without anti-skinning additive determined under identical conditions was 29 seconds, that of the film from the sample containing butanone oxime was 32 seconds and that of the film from the sample containing diethyl hydroxylamine was 37 seconds, in each case after a storage period of 1 week.

7. 0.38 g of a cobalt-containing mixed drier (trade name Octa-Soligen Trockner 203 from Borchers GmbH, contains 1.2 wt. % Co, 3.2 wt. % zinc and 7.2 wt. % barium) was added to a coating composition consisting of 25.0 g of a high-gloss white alkyd resin topcoat (binder solids content 36.9 wt. %). 0.069 g of the mixture listed under i) was added to the formulation and the time taken for a skin to form on the surface of a closed 125 ml PE beaker filled to approx. ¼ was established. Skinning was prevented for more than 21 days in this case. By way of comparison, the skinning time for a sample without anti-skinning additive determined under identical conditions was 2 days and that for a sample containing a conventional, suitable amount of butanone oxime (0.041 g) was 10 days. The color co-ordinate b* of a corresponding paint film with a 100 µm wet film thickness (according to CIELAB, corresponding to DIN 6174) determined after a storage period of 1 week resulted in a value when the mixture according to the invention was used that was 0.166 points lower than the tristimulus value of the sample containing butanone oxime, determined under identical conditions. At the same time a tristimulus value was obtained that was 0.3117 points lower than the tristimulus value of the sample without anti-skinning agent determined under identical conditions, as a result of which a reduced yellowing of the film was indicated. The gloss of the paint film (according to DIN 67530) determined after a storage period of 1 week was determined as 87.8 points (measured at 20°) and 95.6 points (measured at 60°) when the mixture according to the invention was used. By way of comparison, the gloss of the paint film from the sample without anti-skinning additive determined under identical conditions was 81.6 points (measured at 20°) and 88.5 points (measured at 60°), that of the film from the sample containing butanone oxime was 82.1 and 89.9 points (at 20° and 60° respectively).

8. 0.20 g of a cobalt-containing drier (trade name Octa-Soligen Cobalt 6 from Borchers GmbH, contains 6 wt. % Co), 0.25 g of a zirconium-containing drier (trade name Octa-Soligen Zirkon 18 from Borchers GmbH, contains 18 wt. % Zr) and 0.46 g of a calcium-containing drier (trade name Octa-Soligen Calcium 10 from Borchers GmbH, contains 10 wt. % calcium) were added to a coating composition consisting of 40.0 g of a high-gloss white alkyd resin topcoat (binder solids content 38 wt. %). 0.092 g of the mixture listed under k) was added to the formulation and the time taken for a skin to form on the surface of a closed 125 ml PE beaker filled to approx. ¼ was established. Skinning was prevented for more than 28 days in this case. By way of comparison, the skinning time for a sample without anti-skinning additive determined under identical conditions was 5 days and that for a sample containing a conventional, suitable amount of butanone oxime (0.162 g) was 21 days. The König pendulum hardness (determined according to DIN 53157, 100 µm wet film thickness) of a paint film to which the mixture according to the invention had been added was 79 seconds after a storage period of 1 week. By way of comparison, the pendulum hardness of the paint film from the sample without anti-skinning additive and that of the film from the sample containing butanone oxime, determined under identical conditions, was in each case 76 seconds after a storage period of 1 week. The color co-ordinate b* of a corresponding paint film with a 100 µm wet film thickness (according to CIELAB, corresponding to DIN 6174) determined after a storage period of 1 week resulted in a value when the mixture according to the invention was used that was 0.293 points lower than the tristimulus value of the sample containing butanone oxime, determined under identical conditions, as a result of which a reduced yellowing of the film is indicated when the mixture according to the invention is used.

9. 0.20 g of a cobalt-containing drier (trade name Octa-Soligen Cobalt 6 from Borchers GmbH, contains 6 wt. % Co), 0.25 g of a zirconium-containing drier (trade name Octa-Soligen Zirkon 18 from Borchers GmbH, contains 18 wt. % Zr) and 0.46 g of a calcium-containing drier (trade name Octa-Soligen Calcium 10 from Borchers GmbH, contains 10 wt. % calcium) were added to a coating composition consisting of 40.0 g of a high-gloss white alkyd resin topcoat (binder solids content 38 wt. %). 0.092 g of the mixture listed under l) was added to the formulation and the time taken for a skin to form on the surface of a closed 125 ml PE beaker filled to approx. ¼ was established. Skinning was prevented for more than 28 days in this case. By way of comparison, the skinning time for a sample without anti-skinning additive determined under identical conditions was 5 days and that for a sample containing a conventional, suitable amount of butanone oxime (0.162 g) was 21 days. The König pendulum hardness (determined according to DIN 53157, 100 µm wet film thickness) of a paint film to which the mixture according to the invention had been added was 78 seconds after a storage period of 1 week. By way of comparison, the pendulum hardness of the paint film from the sample without anti-skinning additive and that of the film from the sample containing butanone oxime, determined under identical conditions, was in each case 76 seconds after a storage period of 1 week. The film brightness L of a corresponding paint film with a 100 μm wet film thickness (according to CIELAB, corresponding to DIN 6174), determined after a storage period of 1 week, resulted in a value when the mixture according to the invention was used that was 0.318 points higher than the value for the sample containing butanone oxime, determined under identical conditions, as a result of which a higher film brightness in the coating containing the mixture according to the invention was indicated.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preventing skinning of an oxidatively drying paint or coating composition comprising:
   incorporating an anti-skinning agent, comprising
     an organic compound of formula (I)

(I)

where
   $R^1$ and $R^2$ mutually independently represent hydrogen, a linear or branched, saturated or unsaturated $C_1$-$C_{20}$ aliphatic radical, which can optionally be mono- or polysubstituted, or a $C_6$-$C_{12}$ aryl radical, a $C_7$-$C_{14}$ araliphatic radical or a $C_5$-$C_7$ cycloaliphatic radical, and,
   an organic compound of formula (III)

(III)

where
   $R^5$ represents hydrogen, a hydroxyl radical or a $C_1$-$C_7$ alkoxy radical and
   $R^6$ represents hydrogen or an amine radical —$NR^{11}R^{12}$, $R^{11}$ and $R^{12}$ mutually independently represent hydrogen, $C_1$-$C_6$ aliphatic radical, or $C_5$-$C_7$ cycloaliphatic radical, or amine radical —$NR^1R^2$
with the proviso that $R^5$ and $R^6$ are not simultaneously hydrogen, into the paint or coating composition.

2. The process according to claim 1, wherein the anti-skinning agent further comprises water and/or an organic solvent.

3. The process according to claim 1, wherein the compounds of formula (I) and (III) are in the form of aqueous dispersions or emulsions.

4. The process according to claim 1, wherein the amount of anti-skinning agent is between 0.001 and 2.0 wt. % based on the paint or coating composition.

5. The process according to claim 1, wherein the amount of anti-skinning agent is between 0.01 to 0.5 wt. % based on the paint or coating composition.

6. The process according to claim 1, wherein the composition of matter further comprises a pigment.

7. The process according to claim 1, wherein the paint or coating composition is a colorless or pigmented paint or coating composition, a printing ink based on oxidatively drying binders, an oxidatively drying paint system, or a spraying agent in a printing ink.

* * * * *